United States Patent
Polakowski et al.

(10) Patent No.: US 8,360,449 B2
(45) Date of Patent: Jan. 29, 2013

(54) SUSPENSION ASSEMBLIES AND SYSTEMS FOR LAND VEHICLES

(75) Inventors: Stephen E. Polakowski, Atlantic Mine, MI (US); Christian Michael Muehlfeld, Chassell, MI (US); Jeffrey Edward Pruetz, Atlantic Mine, MI (US)

(73) Assignee: Great Lakes Sound & Vibration, Inc., Houghton, MI (US)

( * ) Notice: Subject to any disclaimer, the term of this patent is extended or adjusted under 35 U.S.C. 154(b) by 164 days.

(21) Appl. No.: 12/946,487

(22) Filed: Nov. 15, 2010

(65) Prior Publication Data

US 2011/0115180 A1 May 19, 2011

Related U.S. Application Data

(60) Provisional application No. 61/261,584, filed on Nov. 16, 2009.

(51) Int. Cl.
*B62D 17/00* (2006.01)
*B60G 7/02* (2006.01)
(52) U.S. Cl. ................................ 280/86.751; 280/86.758
(58) Field of Classification Search ............ 280/86.757, 280/86.75, 86.751, 86.756, 86.758
See application file for complete search history.

(56) References Cited

U.S. PATENT DOCUMENTS

| | | | | |
|---|---|---|---|---|
| 2,115,915 A | * | 5/1938 | McCain | 280/86.757 |
| 3,884,314 A | | 5/1975 | Callaway | |
| 4,835,714 A | * | 5/1989 | Sano et al. | 700/279 |
| 4,842,295 A | * | 6/1989 | Hawkins | 280/5.522 |
| 5,029,664 A | | 7/1991 | Zulawski | |
| 5,038,882 A | | 8/1991 | Zulawski | |
| 5,048,860 A | * | 9/1991 | Kanai et al. | 280/86.757 |
| 5,094,472 A | * | 3/1992 | Oyama et al. | 280/86.751 |
| 5,348,334 A | * | 9/1994 | Giltinan | 280/124.138 |
| 5,372,377 A | * | 12/1994 | Lee | 280/124.143 |
| 5,992,863 A | * | 11/1999 | Forbes-Robinson et al. | 280/86.751 |
| 6,003,886 A | * | 12/1999 | Kiesel | 280/86.757 |
| 6,009,966 A | | 1/2000 | Olson et al. | |
| 6,279,920 B1 | * | 8/2001 | Choudhery | 280/5.521 |
| 6,311,798 B1 | | 11/2001 | Anderson | |
| 6,634,654 B2 | * | 10/2003 | Mackle et al. | 280/5.521 |
| 6,655,487 B2 | | 12/2003 | Mallette et al. | |
| 6,860,352 B2 | | 3/2005 | Mallette et al. | |
| 6,874,793 B2 | * | 4/2005 | Choudhery | 280/5.521 |
| 6,905,130 B2 | * | 6/2005 | Few | 280/124.169 |
| 6,942,050 B1 | | 9/2005 | Honkala et al. | |
| 6,955,237 B1 | | 10/2005 | Przekwas et al. | |
| 7,198,126 B2 | | 4/2007 | Vaisanen | |
| 7,255,195 B2 | | 8/2007 | Haruna | |
| 2006/0151968 A1 | * | 7/2006 | Kim | 280/86.757 |

* cited by examiner

*Primary Examiner* — Drew Brown
(74) *Attorney, Agent, or Firm* — Andrus, Sceales, Starke & Sawall, LLP

(57) ABSTRACT

A suspension assembly for a land vehicle comprises a spindle defining a steering axis for the land vehicle and configured to pivotably couple to a ground contact; an upper pivotable member having an inboard end configured to pivotably couple to the land vehicle and an outboard end pivotably coupled to the spindle; a lower pivotable member having an inboard end configured to pivotably couple to the land vehicle and an outboard end pivotably coupled to the spindle; a resilient member having an upper end configured to pivotably couple to the land vehicle and a lower end pivotably coupled to the spindle; a caster adjustment mechanism adjusting the position of one of the upper pivotable member and lower pivotable member relative to the spindle to thereby adjust caster; and a camber adjustment mechanism adjusting the position of one of the upper pivotable member and lower pivotable member relative to the spindle to thereby adjust camber.

41 Claims, 8 Drawing Sheets

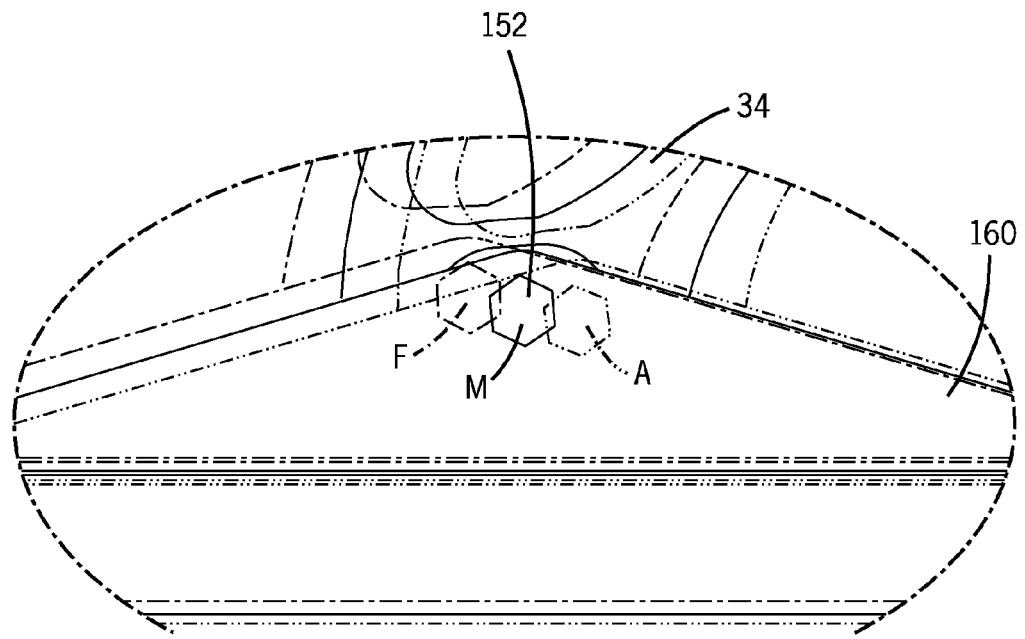
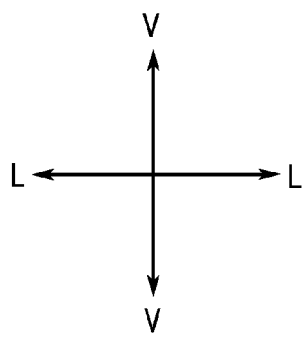
FIG. 7

SUSPENSION ASSEMBLIES AND SYSTEMS FOR LAND VEHICLES

CROSS-REFERENCE TO RELATED APPLICATION

The present application claims priority to and the benefit of U.S. Provisional Patent Application No. 61/261,584, which is incorporated herein by reference.

FIELD

The present disclosure relates to suspension assemblies and systems for land vehicles, including recreational land vehicles such as snowmobiles, all terrain vehicles, and/or the like.

BACKGROUND

Land vehicles, such as for example snowmobiles, typically include a chassis having a rear portion that is supported and driven on the ground by a track and a front portion that is supported and steered on the ground by a pair of ground contacts, typically including skis. A pair of opposed suspension assemblies connect the front portion of the chassis to the ground contacts and support the chassis during travel. The opposed suspension assemblies each define a steering axis for the vehicle and extend in three dimensions including a length dimension, a radial dimension that is substantially perpendicular to the length dimension, and a vertical dimension that is substantially perpendicular to the length dimension and substantially perpendicular to the radial dimension.

The spatial positioning and movement of the suspension assemblies and related steering axes are often defined in terms of, among other things, camber, caster, caster trail, toe, and roll center height. Camber is the angle of the steering axes relative to vertical, as viewed from the front or the rear of the vehicle. If the steering axis leans in towards the chassis, it has negative camber; if the axis leans away from the chassis, it has positive camber. Caster is the angle to which the steering axes are tilted forward or rearward from vertical, as viewed from the side. If the steering axis is tilted backward (that is, the top pivot is positioned farther rearward than the bottom pivot), then caster is positive; if the axis is tilted forward, then caster is negative. Caster trail is the distance in side elevation between the point where the steering axis intersects the ground, and the center of the ground contact patch. Caster trail is considered positive when the intersection point is forward of the ground contact center and negative when it is rearward of the ground contact center. When the ground contacts are set so that their leading edges are pointed towards each other, the ground contacts are said to have toe-in. If the leading edges point away from each other, the ground contacts are said to have toe-out. The amount of toe can be expressed in degrees to which the ground contacts are out of parallel, or more commonly, as the difference between the track widths as measured at the leading and trailing edges of the ground contacts. Roll center height is the point in the transverse vertical plane through any pair of ground contact points at which lateral forces may be applied to the sprung mass without producing suspension roll.

SUMMARY

The present disclosure arose from the present inventors' research and development of improved suspension assemblies for land vehicles, including for example snowmobiles, all terrain vehicles, motorcycles, and the like.

In one example, a suspension assembly for a land vehicle comprises a spindle defining a steering axis for the land vehicle and configured to pivotably couple to a ground contact; an upper pivotable member having an inboard end configured to pivotably couple to the land vehicle and an outboard end pivotably coupled to the spindle; a lower pivotable member having an inboard end configured to pivotably couple to the land vehicle and an outboard end pivotably coupled to the spindle; a resilient member having an upper end configured to couple to the land vehicle and a lower end pivotably coupled to the spindle; a caster adjustment mechanism adjusting the position of one of the upper pivotable member and lower pivotable member relative to the spindle to thereby adjust caster; and a camber adjustment mechanism adjusting the position of one of the upper pivotable member and lower pivotable member relative to the spindle to thereby adjust camber.

In another example, a suspension assembly for a land vehicle comprises a spindle defining a steering axis for the land vehicle and configured to pivotably couple to a ground contact extending in a length dimension; an upper pivotable member extending in a radial dimension and having an inboard end configured to pivotably couple to the land vehicle and an outboard end pivotably coupled to the spindle; a lower pivotable member extending in the radial dimension and located below the upper pivotable member in a vertical dimension, the lower pivotable member having an inboard end configured to pivotably couple to the land vehicle and an outboard end pivotably coupled to the spindle; a resilient member having an upper end configured to couple to the land vehicle and a lower end pivotably coupled to the spindle; and a caster adjustment mechanism adjusting the position of one of the upper pivotable member and lower pivotable member relative to the spindle in the length dimension to thereby adjust caster.

In a further example, the suspension assembly comprises a camber adjustment mechanism adjusting the position of one of the upper pivotable member and lower pivotable member relative to the spindle in the radial dimension to thereby adjust camber.

In a further example, a suspension system for a land vehicle comprises a spindle configured to pivotably couple to a ground contact extending in the length dimension and define a steering axis for the land vehicle; an upper pivotable member extending in the radial dimension and having an inboard end configured to pivotably couple to the land vehicle and an outboard end pivotably coupled to the spindle; a lower pivotable member extending in the radial dimension and located below the upper pivotable member in the vertical dimension, the lower pivotable member having an inboard end configured to pivotably couple to the land vehicle and an outboard end pivotably coupled to the spindle; a resilient member extending substantially in the vertical dimension and having an upper end configured to couple to the land vehicle and a lower end pivotably coupled to the spindle; a caster adjustment mechanism adjusting the position of one of the upper pivotable member and lower pivotable member relative to the spindle to thereby change caster of the spindle; and a controller programmed to control adjustment of the caster adjustment mechanism.

In a further example, the control system comprises a camber adjustment mechanism adjusting the position of one of the upper pivotable member and lower pivotable member relative to the spindle to thereby change camber of the spindle, wherein the controller is programmed to control adjustment of the camber adjustment mechanism.

In a further example, the suspension system comprises an input device configured to receive input commands regarding camber and caster adjustment, wherein the controller is in communication with the input device to receive the input commands and control the camber and caster adjustment mechanisms accordingly.

Further examples will be apparent with reference to the following description and drawings.

BRIEF DESCRIPTION OF THE DRAWINGS

FIG. 7 depicts section 7-7 taken in FIG. 6.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different assemblies and systems described herein may be used alone or in combination with other assemblies, systems, and structures such as links, resilient members and/or the like. Various equivalents, alternatives and modifications are possible within the scope of the appended claims. These alternatives and modifications include, but are not limited to the examples depicted and described in the corresponding U.S. Provisional Patent Application No. 61/261,584, which is incorporated herein by reference. Each limitation in the appended claims is intended to invoke interpretation under 35 U.S.C. §112, sixth paragraph only if the term "means for" is explicitly recited in the respective limitation. Further, as used herein, the term "coupled" includes but does not require "direct connection"; the term "coupled" can include operative connection via for example intermediate structures.

Figure 1:
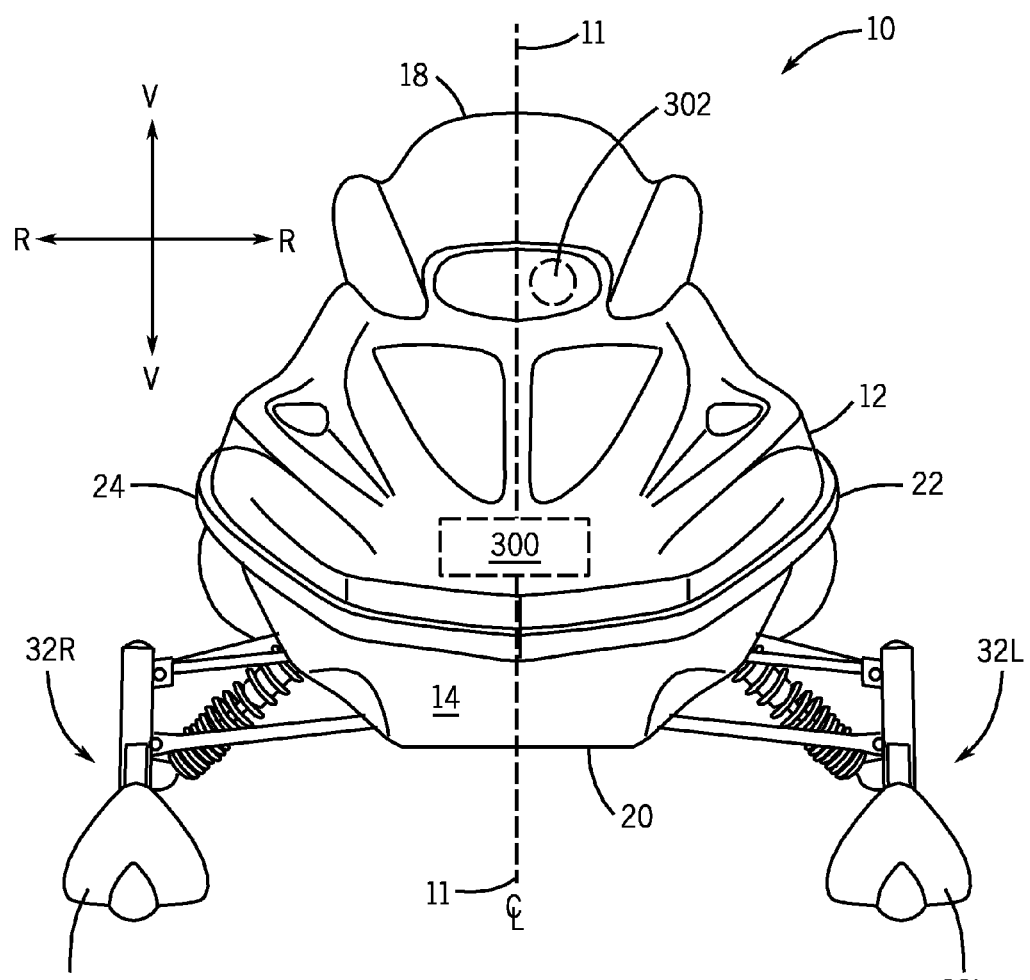
FIG. 1 is a front view of a snowmobile having a pair of front suspension assemblies and a related control system.
Figure 2:
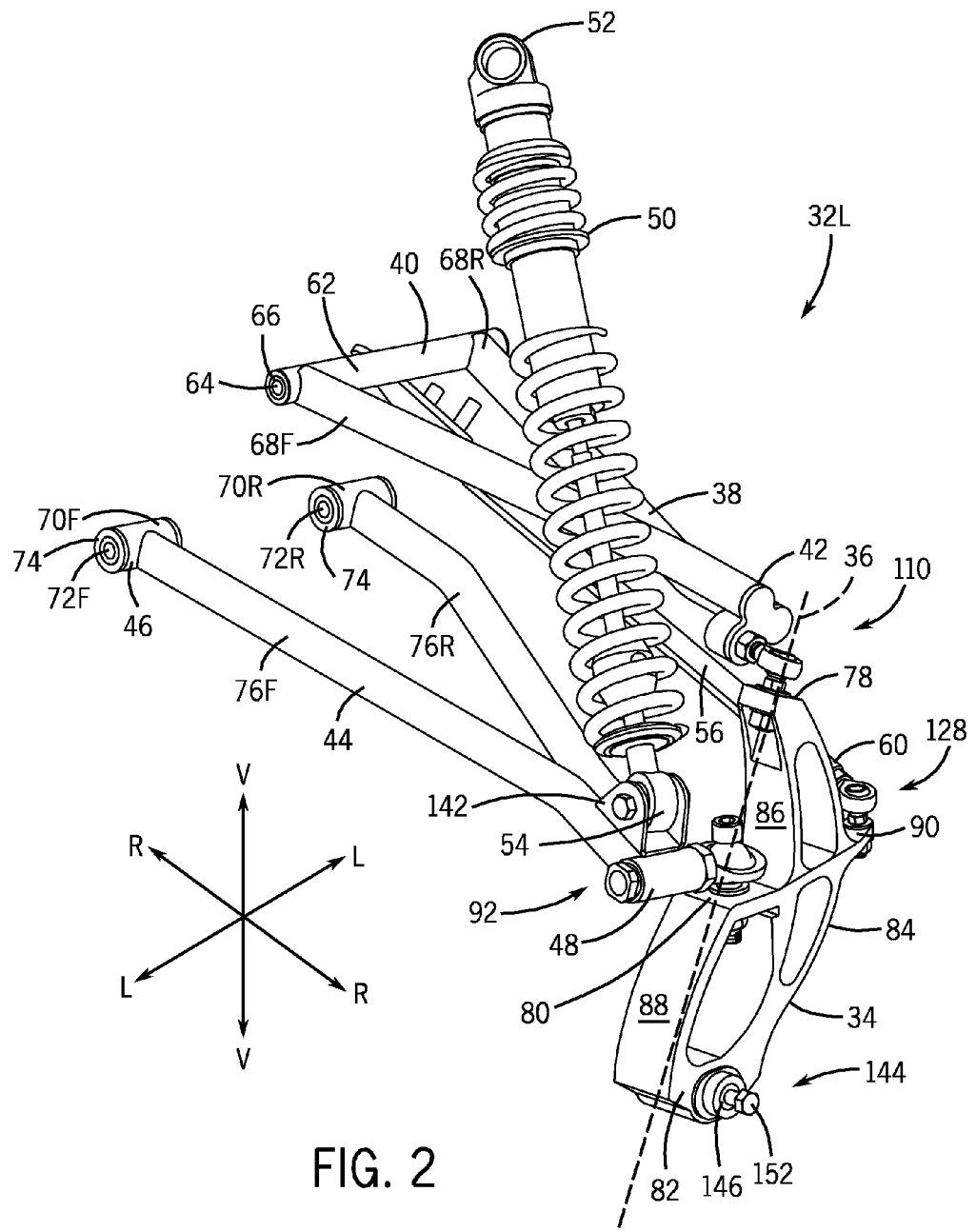
FIG. 2 is a perspective view of a left front suspension assembly.

FIG. 1 schematically depicts a land vehicle, which in the example shown is a snowmobile 10. Although the examples in the present disclosure relate to a snowmobile, the disclosure is applicable to a wide variety of land vehicles such as tractors, all-terrain vehicles, motorcycles and the like. The snowmobile 10 is a three-dimensional structure having a chassis 12 that is elongated from a front end 14 to a rear end (not shown) in a length dimension L. In addition, the snowmobile 10 extends from a top side 18 to a bottom side 20 in a vertical dimension V that is substantially perpendicular to the length dimension L. The snowmobile 10 extends from a left side 22 to a right side 24 in a radial dimension R that is substantially perpendicular to the length dimension L and to the vertical dimension V. The snowmobile 10 transversely extends from a vertical centerline 11 from inboard to outboard.

The snowmobile 10 is supported at its rear end by a driven track that supports and drives the chassis 12 on the ground, as is conventional. The snowmobile 10 is supported at its front end 14 by a pair of ground contacts 28L, 28R, which in the example shown include left and right skis. The ground contacts 28L, 28R are steered by the turning of handlebars (not shown) and are connected to the snowmobile 10 by left and right suspension assemblies 32L, 32R. Each suspension assembly 32L, 32R is a mirror image of the other and includes substantially the same, oppositely oriented structures. For the purposes of discussion, the present disclosure focuses on the structure and function of left suspension assembly 32L; however, similar, oppositely oriented structure and function equally apply to the right suspension assembly 32R.

Referring to FIGS. 2-7, the suspension assembly 32L is a three-dimensional structure and therefore, similar to the snowmobile 10, extends in the longitudinal or length dimension L, radial dimension R, and vertical dimension V. The suspension assembly 32L is configured for attachment to the front end 14 and left side 22 of the snowmobile 10 and is oriented in the snowmobile 10 such that the ground contact 28L is supported and is generally elongated in the length dimension L. The suspension assembly 32L includes a spindle 34 that defines a steering axis 36 for the snowmobile 10. The spindle 34 is configured to pivotably couple to the ground contact 28L, as will be discussed further hereinbelow. The suspension assembly 32L also includes an upper pivotable member 38 that extends generally in the radial dimension R from an inboard end 40 that is configured to pivotably couple to the snowmobile 10 to an outboard end 42 that is pivotably coupled to the spindle 34. The assembly 32L also includes a lower pivotable member 44 extending in the radial dimension R from an inboard end 46 configured to pivotably couple to the snowmobile 10 to an outboard end 48 pivotably coupled to the spindle 34. The lower pivotable member 44 is located below the upper pivotable member 38 in the vertical dimension V.

The suspension assembly 32L also includes a resilient member 50 having an upper end 52 that is configured to couple to the snowmobile 10 and a lower end 54 that is pivotably coupled to the spindle 34 via the lower pivotable member 44. In other examples, the resilient member 50 can be connected to or coupled to different components of the assembly 32L, such as for example the upper pivotable member 38, spindle 34, or other intermediate link(s). The resilient member 50 includes a coil over shock mechanism, but could alternatively include any structure for providing suitable damping and resiliency to the suspension assembly 32L. A steering link 56 is also provided and has an inboard end 58 configured to connect to a conventional steering linkage (not shown) for receiving input from handlebars and conveying such input to an outboard end 60 coupled to the spindle 34.

The form and structure of the upper pivotable member 38, lower pivotable member 44, and steering link 56 can vary from that shown in the figures. In general, the upper pivotable member 38, lower pivotable member 44, and steering link 56 are sized and shaped to achieve requisite clearance for suspension assembly travel and to avoid interference with surrounding structures. In the example shown, the upper pivotable member 38 has a pivot tube 62 generally extending in the length dimension L and configured to pivot about a pin 64 residing in the pivot tube 62. The pivot pin 64 is connected to the chassis 12 of the snowmobile 10 in a conventional manner by, among other things, opposed bushings 66. A pair of elongated tubes 68F, 68R converges in the radial dimension R from the pivot tube 62 at the inboard end 40 to the outboard end 42. The lower pivotable member 44 has two inboard ends 70F, 70R that are each configured to pivot about pins 72F, 72R, respectively. The inboard ends 70F, 70R are configured for attachment to the chassis 12 in a conventional manner via, among other things, bushings 74. The lower pivotable member 44 includes a pair of elongated tubes 76F, 76R that converge in the radial dimension R from the inboard end 46 to the outboard end 48. The shape and configuration of the upper and lower pivotable members 38, 44 can vary from that shown in the drawing figures. For example, the configuration shown for the upper pivotable member 38 can replace the configuration for the lower pivotable 44, and vice versa. Other configurations for pivotable members could also be substituted to achieve the functions described in the present disclosure.

The spindle 34 can also have different shapes and surfaces for attachment to the various components of the assembly 32L. Spindle shaping facilitates weight optimization, pivot placement, and elimination of interferences with surrounding structure. In the example shown in FIGS. 2-6, the spindle 34 has an upper surface 78 for coupling to the upper pivotable member 38, a middle surface 80 for coupling to the lower pivotable member 44, and a lower end 82 for coupling to the ground contact 28L, as will be further described hereinbelow. The spindle 34 has an outer convex surface 84 located generally aft of the upper surface 78 in the length dimension L and an inner concave surface 86 located generally above the middle surface 80 in the vertical dimension V and an inner convex surface 88 located between the middle surface 80 and lower end 82 in the vertical dimension V. A steering link connection surface 90 extends aft from the outer convex surface 84 and is for connecting to the outboard end 60 of the steering link 56. The dimensional relationships between the above-described structures of spindle 34 can change somewhat from that described during travel of the suspension assembly 32L.

Figure 3:
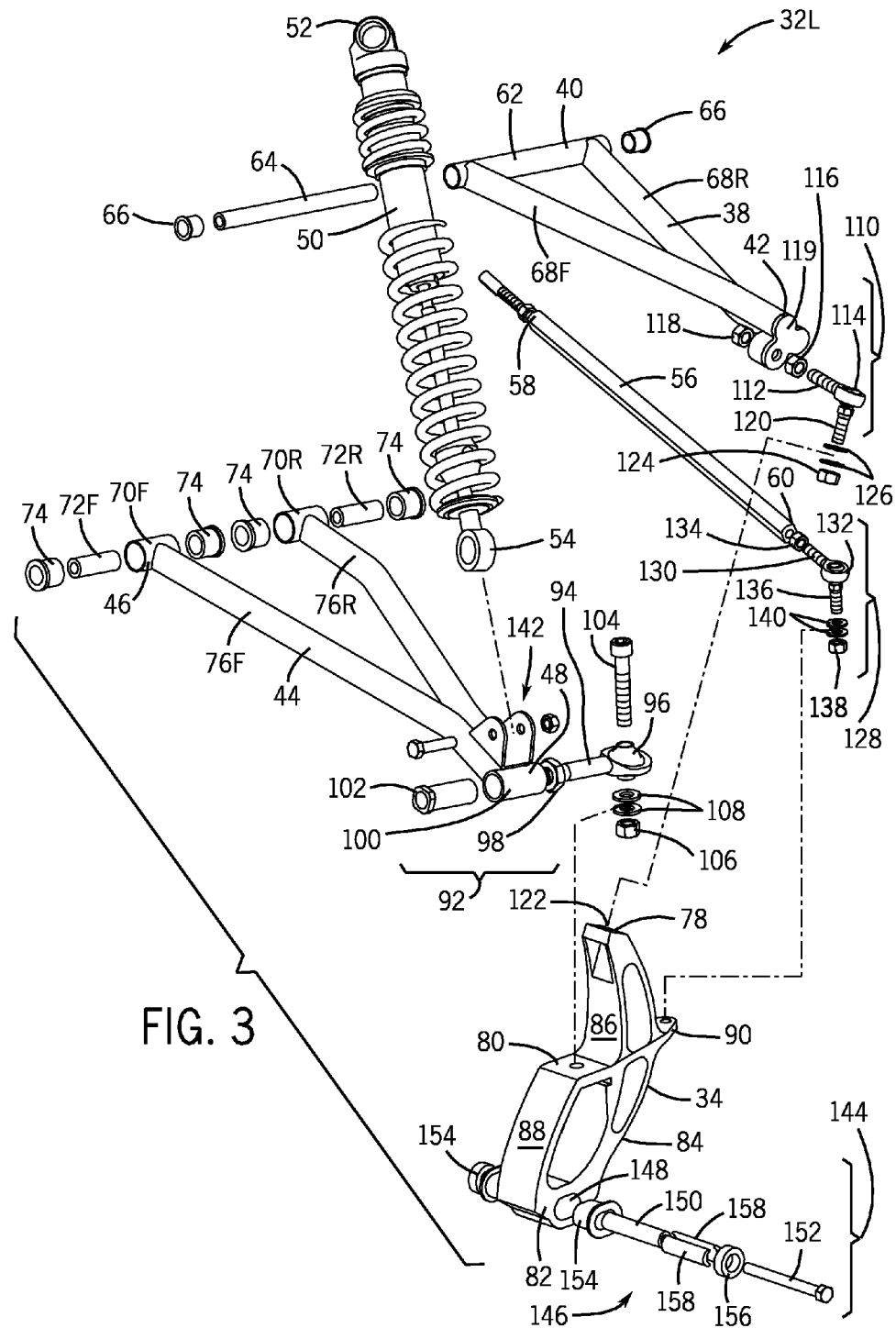
FIG. 3 is an exploded view of the left front suspension assembly.
Figure 4:
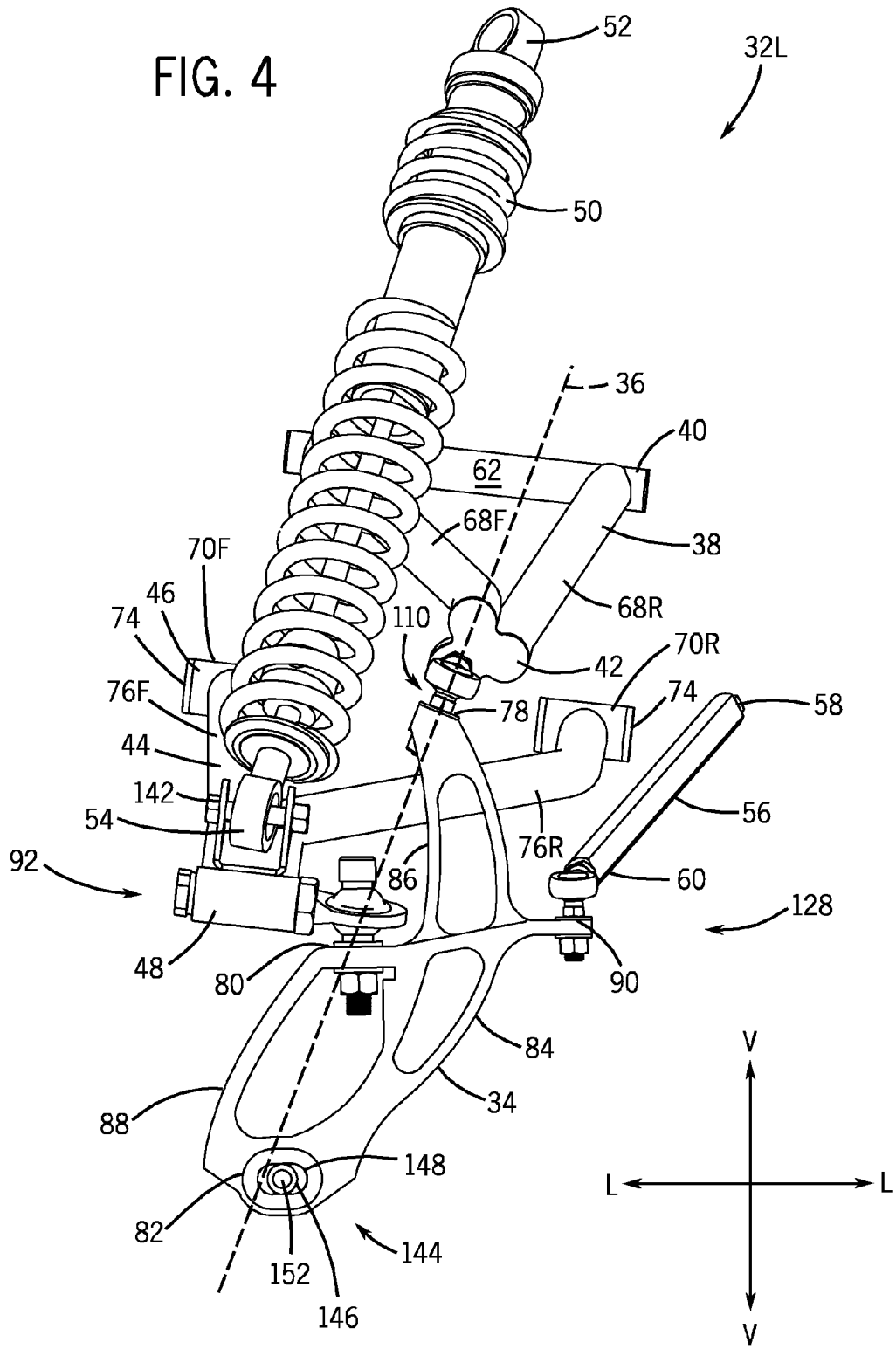
FIG. 4 is a side view of the left front suspension assembly.
Figure 8:
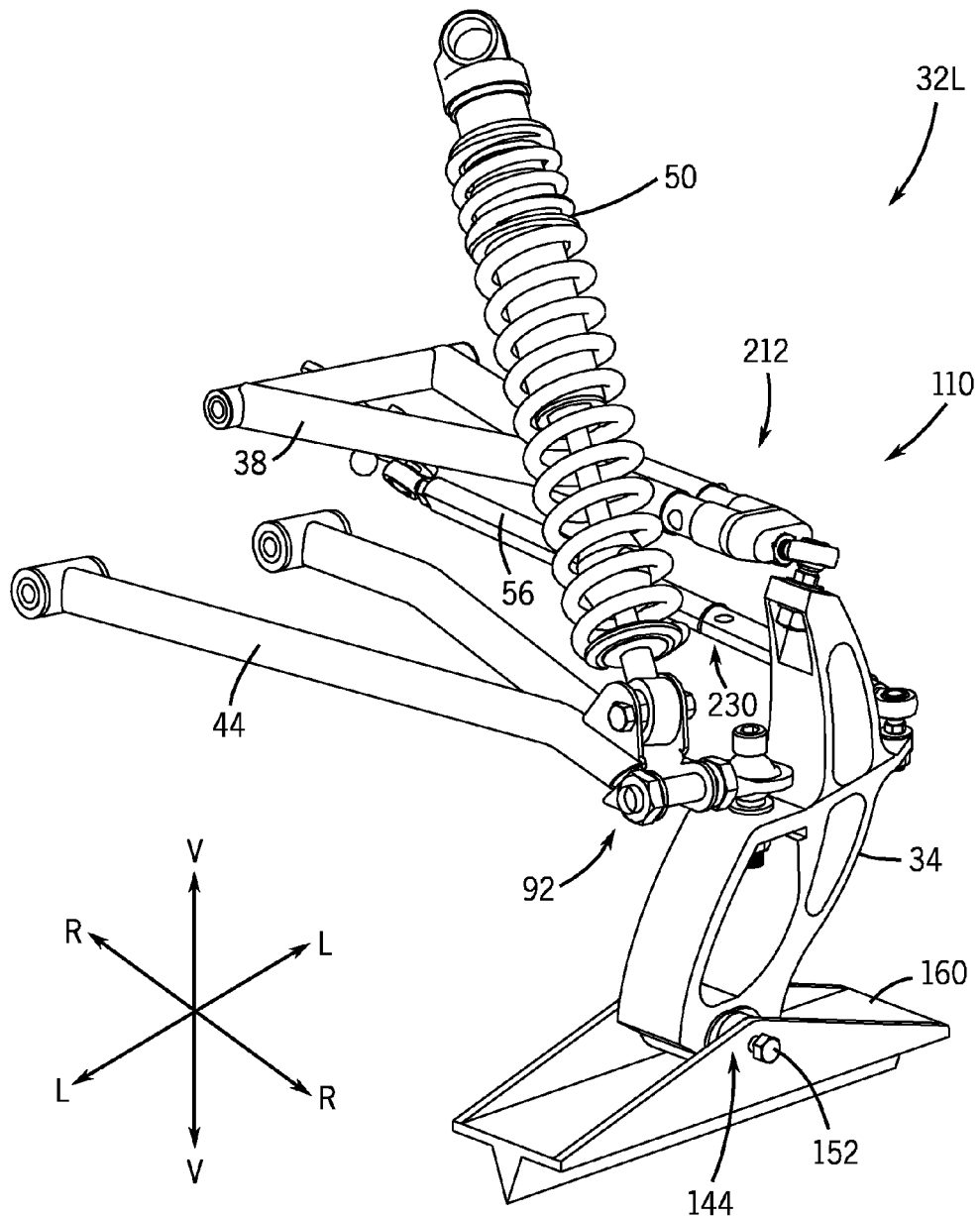
FIG. 8 is a perspective view of a further example of a left front suspension assembly.

Advantageously, the suspension assembly 32L also includes adjustment mechanisms for adjusting caster, camber, toe, and caster trail. Referring mainly to FIG. 3, a caster adjustment mechanism 92 adjusts the position of the lower pivotable member 44 relative to the spindle 34 in the length dimension L. In the example shown, the caster adjustment mechanism 92 is located at the outboard end 48 of the lower pivotable member 44. However it is envisioned that the caster adjustment mechanism 92 could instead be located on the outboard end 42 of the upper pivotable member 38. In the example shown, the caster adjustment mechanism 92 incorporates a threaded shank 94 that is incorporated with a ball joint 96 and connected to the outboard end 48 of the lower pivotable member 44. An adjustment nut 98 is threaded onto the threaded shank 94 and the end of the threaded shank 94 is inserted into a pivot tube 100 at the outboard end 48 of the lower pivotable member 44. A coupling nut 102 is inserted into the pivot tube 100 from an opposite side with respect to the threaded shank 94 until it engages a step (not shown) extending inwardly from the inner diameter of the pivot tube 100. The threaded shank 94 is threaded into the coupling nut 102. Adjustment of the caster mechanism 92 is achieved by relative rotation of the coupling nut 102 with respect to the threaded shank 94. Securing of the caster adjustment mechanism 92 in a particular position is accomplished by tightening the adjustment nut 98 against the pivot tube 100. According to this arrangement, relative rotation of the threaded shank 94 and coupling nut 102 in one direction lengthens the caster adjustment mechanism 92 in the length dimension L and thus decreases caster of the spindle 34 and related steering axis 36. Relative rotation of the threaded shank 94 and coupling nut 102 in an opposite direction shortens the caster adjustment mechanism 92 in the length dimension L and thus increases caster of the spindle 34 and related steering axis 36. Alternate configurations for the caster adjustment mechanism 92 are also envisioned, as will be explained further herein below with respect FIG. 8.

The ball joint 96 allows for rotational pivoting of the spindle 34 with respect to the outboard end 48 of the lower pivotable member 44. The ball joint 96 is coupled to the middle surface 80 of the spindle 34 by a threaded screw 104 and tightening nut 106. Spacers 108 are disposed on either side of the middle surface 80.

Figure 5:
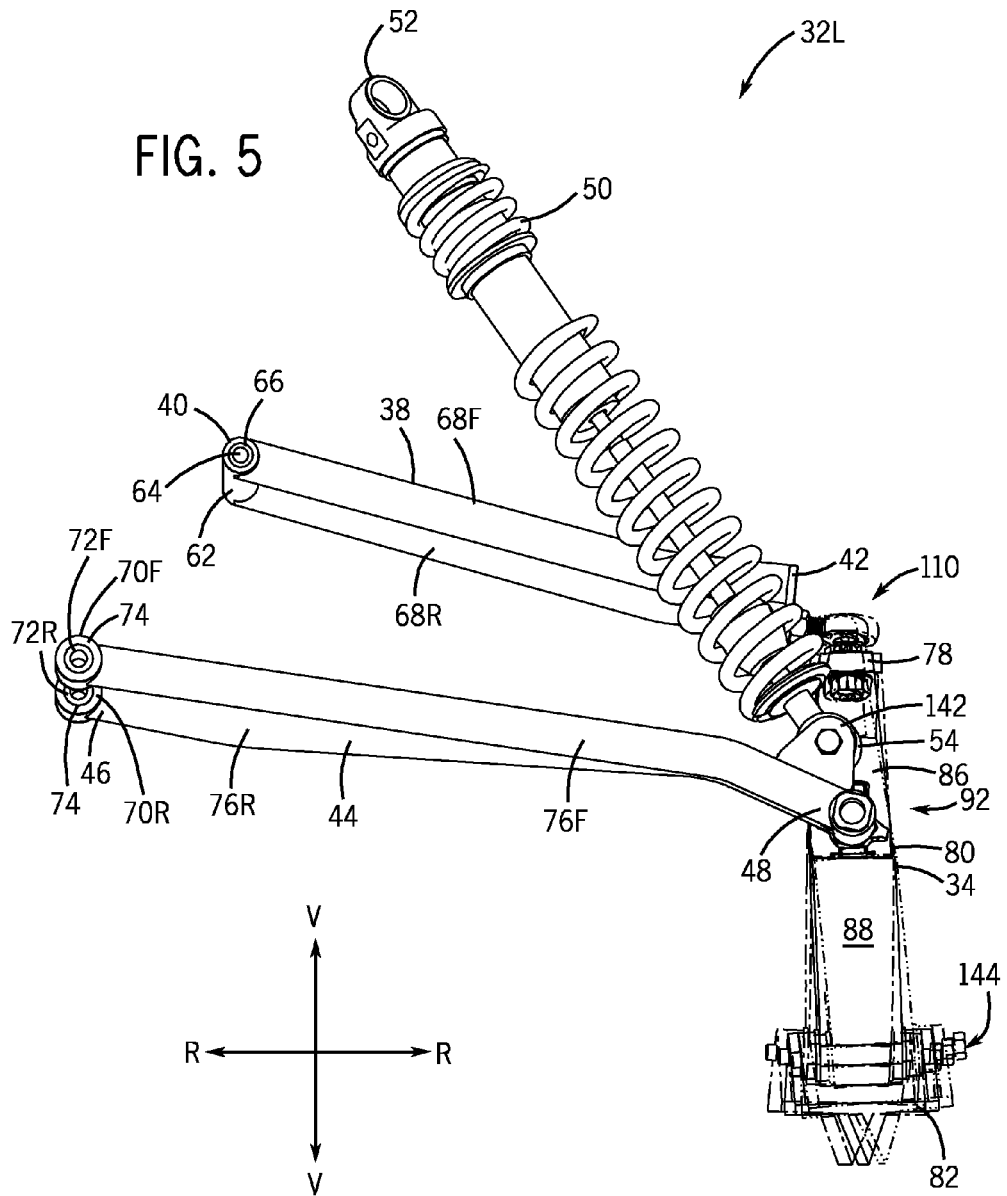
FIG. 5 is a front view of the left front suspension assembly showing adjustment in camber.

Referring mainly to FIGS. 3 and 5, a camber adjustment mechanism 110 is also provided for adjusting the position of the upper pivotable member 38 relative to the spindle 34 in the radial dimension R. It is also envisioned that the camber adjustment mechanism 110 could instead be configured to adjust the position of the lower pivotable member 44. In the example shown, the camber adjustment mechanism 110 includes a threaded shank 112 that is incorporated with a ball joint 114. The threaded shank 112 is further adjustably connected to the outboard end 42 of the upper pivotable member 38. An adjustment nut 116 is threaded onto the threaded shank 112 and then the threaded shank 112 is inserted through a pivot tube 119, which in the example shown is integral with the outboard end 42 of the upper pivotable member 38. A tightening nut 118 is threaded on the end of the threaded shank 112. Rotation of the adjustment nut 116 and tightening nut 118 in a first direction lengthen the threaded shank 112 generally in the radial dimension R and thus increases camber of the spindle 34 and related steering axis 36. Opposite rotation of the adjustment nut 116 and tightening nut 118 shortens the threaded shank 112 in the radial dimension R and thereby decreases camber of the spindle 34 and related steering axis 36. Alternate configurations for the camber adjustment mechanism 110 are also envisioned, as will be explained further hereinbelow with respect to FIG. 8.

The ball joint 114 is connected to the upper surface 78 of the spindle 34 and facilitates pivoting of the upper pivotable member 38 with respect to the spindle 34. Specifically, a threaded screw 120 extends from the ball joint 114 and through an aperture 122 in the upper surface 78. A tightening nut 124 is threaded onto the threaded screw 120 to thereby secure the screw 120 and ball joint 114 to the spindle 34. Spacers 126 are disposed on opposing sides of the upper surface 78.

Figure 6:
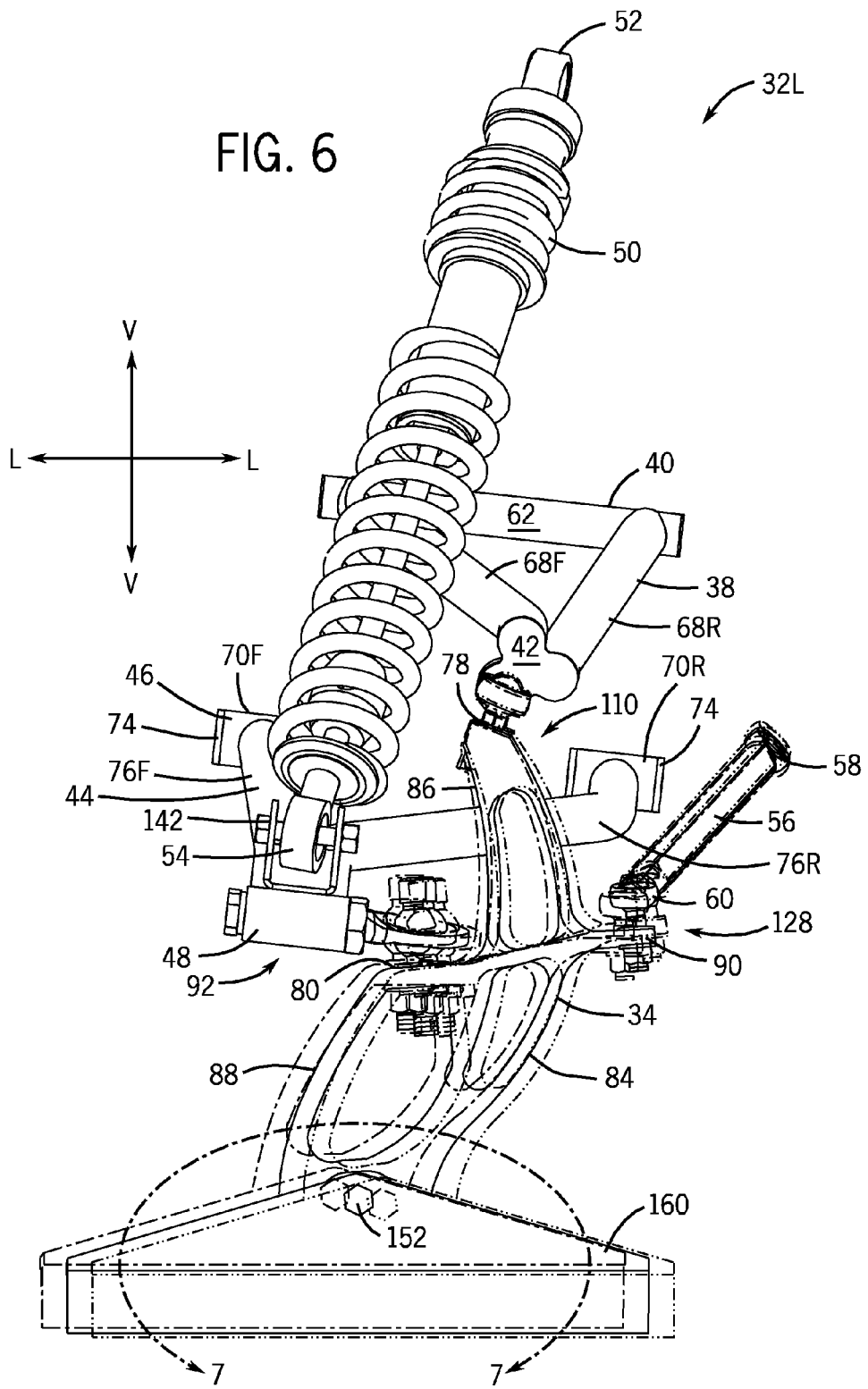
FIG. 6 is a side view of the left front suspension assembly showing adjustment in caster and caster trail.

Referring mainly to FIGS. 3 and 6, a toe adjustment mechanism 128 is also provided for adjusting the position of the steering link 56 relative to the spindle 34 in the radial dimension R. In the example shown, the toe adjustment mechanism 128 includes a threaded shank 130 incorporated with a ball joint 132. The threaded shank 130 is threaded into the outboard end 60 of the steering link 56. An adjustment nut 134 is threaded onto the threaded shank 130 prior to insertion into the outboard end 60 of the steering link 56. The ball joint 132 is coupled to the steering link connection surface 90 by a threaded shank 136 and tightening nut 138. Spacers 140 are disposed on opposing sides of the steering link connection surface 90. Rotation of the adjustment nut 134 in one direction lengthens the threaded shank 130 with respect to the steering link 56, and thus achieves toe-in of the spindle 34 and ground contact 28L. Opposite rotation of the adjustment nut 134 shortens the threaded shank 130 with respect to the steering link 56, and thus achieves toe-out of the spindle 34 and ground contact 28L. Alternate configurations for the toe adjustment mechanism 128 are also envisioned and will be explained further hereinbelow with respect to FIG. 8.

The lower end 54 of the resilient member 50 is pivotably connected to the outboard end 48 of the lower pivotable member 44 by a clevis and pin connection 142. Various other types of conventional connections could be used instead of a clevis and pin connection. Location of the lower end 54 of the resilient member 50 at the outboard end 48 of lower pivotable member 44 advantageously places the resilient member 50 close to inline with, or inline with, vertical forces received by and transferred to the ground contact 28L during suspension assembly travel.

Referring mainly to FIGS. 3, 6 and 7, a caster trail adjustment mechanism 144 is also provided for adjusting the position of the spindle 34 relative to the ski 28L in the length dimension L. In the example shown, the caster trail adjustment mechanism 144 includes a slot and pin connection 146. An oval slot 148 is provided in the lower surface 82 of the spindle 34 and a sleeve 150 and screw 152 are inserted into the oval slot 148. A pair of opposing oval bushings 154 and a spacer 156 is also provided. The outer diameter of the sleeve 150 is small enough to freely slide in the length dimension L within the oval slot 148. Adjustment of the position of the sleeve 150 and related screw 152 can be made via spacer sleeves 158 which are sized to reside within the oval slot 148 and position the sleeve 150 therein with respect to the length dimension L. In the particular example shown, the sleeve 150 and spacer sleeves 158 can be combined to position the sleeve 150 in the oval slot 148 in one of three positions. A fore position F is provided by stacking both spacer sleeves 158 in the slot 148 aft of the sleeve in the length dimension L, thus decreasing caster trail. A middle position M of the sleeve 150 is afforded by sandwiching the spacer sleeves 158 in the slot 148 on opposing sides of the sleeve 150 in the length dimension L. An aft position A of the sleeve 156 is afforded by stacking both of the spacer sleeves 158 in the slot 148 fore of the sleeve 150 in the length dimension L, thus increasing caster trail. Other connecting configurations could be utilized to achieve further adjustability and a wider range of positions of the sleeve 156 with respect to the spindle. As shown in FIG. 6, the screw 152 connects the spindle 34 to a bracket 160 for connection to the ski 28L.

Referring to FIGS. 5-7, camber adjustment mechanism 110 and caster adjustment mechanism 92 are nearly independent. Camber adjustment mechanism 110 effectively increases and decreases the length of the upper pivotable member 38 in the radial dimension R thus tilting the spindle 34 inboard or outboard in the vertical dimension V. Exemplary positions of the spindle 34 caused by adjustment of the camber adjustment mechanism 110 are shown in dashed line in FIG. 5. Caster adjustment mechanism 92 effectively changes the position of the outboard end 48 of lower pivotable member 44 relative to the ball joint 96 on spindle 34. This moves the spindle 34 fore or aft in the length dimension L, as shown in exemplary positions in dashed line in FIGS. 6 and 7. The toe angle, or angle formed between the bracket 160 and length dimension L can be maintained during adjustment of the camber adjustment mechanism 110 and caster adjustment mechanism 92 with corresponding changes in the toe adjustment mechanism 128 to effectively change the length of the steering link 56. Exemplary positions of toe adjustment mechanism 128 are also shown in dashed line in FIG. 6.

The respective structure and function of the adjustment mechanisms 92, 110, 128, 144 can be repositioned with respect to the spindle and do not have to be located at the outboard ends 42, 48, 60 of the pivotable members 38, 44 and steering link 56, respectively. Further, the adjustment mechanisms 92, 110, 128, 144 do not have to embody the particular structures shown. For example, the mechanisms could instead or also incorporate telescoping sleeves, latches, levers, solenoids, cylinders, pins, buttons, slots, eccentrics, or a combination of mechanisms for achieving automatic adjustability. One alternate example is provided in FIG. 8 wherein the threaded shanks 112, 130 are replaced with telescoping joints 212, 230 that enable a user to quickly position the camber to one of a plurality of settings. The telescoping joints 212, 230 each include a spring-loaded button and telescoping member. The adjustment mechanisms could also or instead include a latch, lever, solenoid, cylinder, piston, etc. Similar telescoping function could be utilized to replace threaded shank 94 on caster adjustment mechanism 92. In other examples, a single adjustable mechanism could be employed. Such a mechanism could have an axis placed at an angle relative to the vertical dimension V and length dimension L to allow for adjustability in both camber and caster. The single adjustable mechanism could include for example a ball joint or other similar device and be positioned on the upper and/or lower pivotable members 38, 44.

The examples shown and described include manual, mechanical adjustment mechanisms 92, 110, 128, 144. However, in other examples, a suspension system can be provided that includes a controller 300 incorporating at least one programmable microprocessor and memory and communicatively connected to control movements of the respective adjustment mechanisms 92, 110, 128, 144. Specifically, the controller 300 can be programmed to control adjustment of the respective mechanisms 92, 110, 128, 144 to thereby optimize caster, camber, toe, and caster trail of the suspension assemblies 32L, 32R according to operator preference. An input device 302 such as a keyboard, joystick or touchpad screen can be provided on the land vehicle and configured to receive input commands from the operator regarding caster, camber, toe and/or caster trail adjustment and then communicate these inputs to the controller 300 for further control of the adjustment mechanisms. The controller 300 can control the respective adjustment mechanisms via for example electronic or pneumatic actuators.

What is claimed is:

1. A suspension assembly for a land vehicle comprising:
    a spindle defining a steering axis for the land vehicle and configured to pivotably couple to a ground contact;
    an upper pivotable member having an inboard end configured to pivotably couple to the land vehicle and an outboard end pivotably coupled to the spindle;
    a lower pivotable member having an inboard end configured to pivotably couple to the land vehicle and an outboard end pivotably coupled to the spindle;
    a resilient member having an upper end configured to couple to the land vehicle and a lower end pivotably coupled to the spindle;
    a caster adjustment mechanism adjusting the position of the lower pivotable member relative to the spindle to thereby adjust caster; and
    a camber adjustment mechanism adjusting the position of the upper pivotable member relative to the spindle to thereby adjust camber.

2. A suspension assembly according to claim 1, wherein at least one of the camber adjustment mechanism and caster adjustment mechanism comprises an adjustable ball joint.

3. A suspension assembly according to claim 1, wherein at least one of the camber adjustment mechanism and caster adjustment mechanism comprises a threaded shank.

4. A suspension assembly according to claim 1, wherein at least one of the camber adjustment mechanism and caster adjustment mechanism comprises a telescoping sleeve.

5. A suspension assembly according to claim 1, wherein the lower end of the resilient member is coupled to the spindle via the outboard end of the lower pivotable member.

6. A suspension assembly according to claim 5, wherein the lower end of the resilient member is coupled to the spindle via the caster adjustment mechanism.

7. A suspension assembly according to claim 6, comprising a clevis and pin coupling the lower end of the resilient member to the caster adjustment mechanism.

8. A suspension assembly according to claim 1, wherein the resilient member comprises a spring and a shock.

9. A suspension assembly according to claim 1, comprising a steering link having an outboard end coupled to the spindle.

10. A suspension assembly according to claim 9, comprising a toe adjustment mechanism adjusting the position of the steering link relative to the spindle to thereby adjust toe.

11. A suspension assembly according to claim 10, wherein the toe adjustment mechanism comprises an adjustable ball joint.

12. A suspension assembly according to claim 10, wherein the toe adjustment mechanism comprises a threaded shank.

13. A suspension assembly according to claim 10, wherein the toe adjustment mechanism comprises a telescoping sleeve.

14. A suspension assembly according to claim 1, comprising a caster trail adjustment mechanism adjusting the position of the spindle relative to the ground contact to thereby adjust caster trail.

15. A suspension assembly according to claim 14, wherein the caster trail adjustment mechanism comprises a slot and pin connection.

16. A suspension assembly according to claim 1, wherein the spindle comprises an upper surface for coupling to the upper pivotable member, a middle surface for coupling to the lower pivotable member, and a lower surface for coupling to the ground contact.

17. A suspension assembly according to claim 16, wherein the spindle has an outer convex surface located aft of the upper surface and an inner concave surface fore of the upper surface.

18. A suspension assembly according to claim 17, wherein the spindle has an inner convex surfaces and wherein the middle surface is located between the inner concave and convex surfaces.

19. A suspension assembly according to claim 1, wherein the land vehicle is a snowmobile.

20. A suspension assembly according to claim 19, wherein the inboard end of the upper pivotable member is configured for attachment to a chassis of the land vehicle.

21. A suspension assembly according to claim 20, wherein the inboard end of the lower pivotable member is configured for attachment to a chassis of the land vehicle.

22. A suspension assembly according to claim 1, wherein the suspension assembly comprises a front suspension assembly.

23. A suspension assembly according to claim 22, wherein the land vehicle comprises a snowmobile.

24. A suspension assembly for a land vehicle that extends in three dimensions including a length dimension, a radial dimension that is substantially perpendicular to the length dimension, and a vertical dimension that is substantially perpendicular to the length dimension and substantially perpendicular to the radial dimension, the suspension assembly comprising:
   a spindle defining a steering axis for the land vehicle and configured to pivotably couple to a ground contact extending in the length dimension;
   an upper pivotable member extending in the radial dimension and having an inboard end configured to pivotably couple to the land vehicle and an outboard end pivotably coupled to the spindle;
   a lower pivotable member extending in the radial dimension and located below the upper pivotable member in the vertical dimension, the lower pivotable member having an inboard end configured to pivotably couple to the land vehicle and an outboard end pivotably coupled to the spindle;
   a resilient member having an upper end configured to couple to the land vehicle and a lower end pivotably coupled to the spindle; and
   a caster adjustment mechanism adjusting the position of the lower pivotable member relative to the spindle in the length dimension to thereby adjust caster.

25. A suspension assembly according to claim 24, comprising a camber adjustment mechanism adjusting the position of one of the upper pivotable member and lower pivotable member relative to the spindle in the radial dimension to thereby adjust camber.

26. A suspension assembly according to claim 24, comprising a steering link having an outboard end coupled to the spindle and a toe adjustment mechanism adjusting the position of the steering link relative to the spindle to thereby adjust toe.

27. A suspension assembly according to claim 24, comprising a caster trail adjustment mechanism adjusting the position of the spindle relative to the ground contact to thereby adjust caster trail.

28. A suspension assembly for a land vehicle that extends in three dimensions including a length dimension, a radial dimension that is substantially perpendicular to the length dimension, and a vertical dimension that is substantially perpendicular to the length dimension and substantially perpendicular to the radial dimension, the suspension assembly comprising:
   a spindle configured to pivotably couple to a ground contact extending in the length dimension and define a steering axis for the land vehicle;
   an upper pivotable member extending in the radial dimension and having an inboard end configured to pivotably couple to the land vehicle and an outboard end pivotably coupled to the spindle;
   a lower pivotable member extending in the radial dimension and located below the upper pivotable member in the vertical dimension, the lower pivotable member having an inboard end configured to pivotably couple to the land vehicle and an outboard end pivotably coupled to the spindle;
   a resilient member extending substantially in the vertical dimension and having an upper end configured to couple to the land vehicle and a lower end pivotably coupled to the spindle; and
   means for adjusting the position of the lower pivotable members relative to the spindle in the length dimension to thereby adjust caster.

29. A suspension assembly according to claim 28, wherein the suspension assembly comprises a front suspension assembly.

30. A suspension assembly according to claim 29, wherein the land vehicle comprises a snowmobile.

31. A suspension assembly according to claim 30, comprising means for adjusting the position of one of the upper pivotable member and lower pivotable member relative to the spindle to thereby adjust camber.

32. A suspension assembly according to claim 30, comprising a steering link and means for adjusting the position of the steering link relative to the spindle to thereby adjust toe.

33. A suspension assembly according to claim 30, comprising means for adjusting the position of the spindle relative to the ground contact to thereby adjust caster trail.

34. A suspension system for a land vehicle that extends in three dimensions including a length dimension, a radial dimension that is substantially perpendicular to the length dimension, and a vertical dimension that is substantially perpendicular to the length dimension and substantially perpendicular to the radial dimension, the suspension system comprising:
- a spindle configured to pivotably couple to a ground contact extending in the length dimension and define a steering axis for the land vehicle;
- an upper pivotable member extending in the radial dimension and having an inboard end configured to pivotably couple to the land vehicle and an outboard end pivotably coupled to the spindle;
- a lower pivotable member extending in the radial dimension and located below the upper pivotable member in the vertical dimension, the lower pivotable member having an inboard end configured to pivotably couple to the land vehicle and an outboard end pivotably coupled to the spindle;
- a resilient member extending substantially in the vertical dimension and having an upper end configured to couple to the land vehicle and a lower end pivotably coupled to the spindle;
- a caster adjustment mechanism adjusting the position of one of the upper pivotable member and lower pivotable member relative to the spindle in the length dimension to thereby change caster of the spindle; and
- a controller programmed to control adjustment of the caster adjustment mechanism.

35. A suspension system according to claim 34, comprising a camber adjustment mechanism adjusting the position of one of the upper pivotable member and lower pivotable member relative to the spindle to thereby change camber of the spindle, wherein the controller is programmed to control adjustment of the camber adjustment mechanism.

36. A suspension system according to claim 35, comprising an input device configured to receive input commands regarding camber and caster adjustment, wherein the controller is in communication with the input device to receive the input commands and control the camber and caster adjustment mechanisms accordingly.

37. A suspension assembly for a land vehicle comprising:
- a spindle defining a steering axis for the land vehicle and configured to pivotably couple to a ground contact;
- an upper pivotable member having an inboard end configured to pivotably couple to the land vehicle and an outboard end pivotably coupled to the spindle;
- a lower pivotable member having an inboard end configured to pivotably couple to the land vehicle and an outboard end pivotably coupled to the spindle;
- a resilient member having an upper end configured to couple to the land vehicle and a lower end pivotably coupled to the spindle;
- a caster adjustment mechanism adjusting the position of one of the upper pivotable member and lower pivotable member relative to the spindle to thereby adjust caster;
- a camber adjustment mechanism adjusting the position of one of the upper pivotable member and lower pivotable member relative to the spindle to thereby adjust camber; and
- a caster trail adjustment mechanism adjusting the position of the spindle relative to the ground contact to thereby adjust caster trail.

38. A suspension assembly according to claim 37, wherein the caster trail adjustment mechanism comprises a slot and pin connection.

39. A suspension assembly for a land vehicle that extends in three dimensions including a length dimension, a radial dimension that is substantially perpendicular to the length dimension, and a vertical dimension that is substantially perpendicular to the length dimension and substantially perpendicular to the radial dimension, the suspension assembly comprising:
- a spindle defining a steering axis for the land vehicle and configured to pivotably couple to a ground contact extending in the length dimension;
- an upper pivotable member extending in the radial dimension and having an inboard end configured to pivotably couple to the land vehicle and an outboard end pivotably coupled to the spindle;
- a lower pivotable member extending in the radial dimension and located below the upper pivotable member in the vertical dimension, the lower pivotable member having an inboard end configured to pivotably couple to the land vehicle and an outboard end pivotably coupled to the spindle;
- a resilient member having an upper end configured to couple to the land vehicle and a lower end pivotably coupled to the spindle;
- a caster adjustment mechanism adjusting the position of one of the upper pivotable member and lower pivotable member relative to the spindle in the length dimension to thereby adjust caster; and
- a caster trail adjustment mechanism adjusting the position of the spindle relative to the ground contact to thereby adjust caster trail.

40. A suspension assembly for a land vehicle that extends in three dimensions including a length dimension, a radial dimension that is substantially perpendicular to the length dimension, and a vertical dimension that is substantially perpendicular to the length dimension and substantially perpendicular to the radial dimension, the suspension assembly comprising:
- a spindle configured to pivotably couple to a ground contact extending in the length dimension and define a steering axis for the land vehicle;
- an upper pivotable member extending in the radial dimension and having an inboard end configured to pivotably couple to the land vehicle and an outboard end pivotably coupled to the spindle;
- a lower pivotable member extending in the radial dimension and located below the upper pivotable member in the vertical dimension, the lower pivotable member having an inboard end configured to pivotably couple to the land vehicle and an outboard end pivotably coupled to the spindle;
- a resilient member extending substantially in the vertical dimension and having an upper end configured to couple to the land vehicle and a lower end pivotably coupled to the spindle;
- means for adjusting the position of at least one of the upper pivotable member and lower pivotable member relative to the spindle in the length dimension to thereby adjust caster; and
- means for adjusting the position of the spindle relative to the ground contact to thereby adjust caster trail;

wherein the suspension assembly comprises a front suspension assembly; and wherein the land vehicle comprises a snowmobile.

41. A suspension assembly for a land vehicle comprising:

a spindle defining a steering axis for the land vehicle and configured to pivotably couple to a ground contact;

an upper pivotable member having an inboard end configured to pivotably couple to the land vehicle and an outboard end pivotably coupled to the spindle;

a lower pivotable member having an inboard end configured to pivotably couple to the land vehicle and an outboard end pivotably coupled to the spindle;

a resilient member having an upper end configured to couple to the land vehicle and a lower end pivotably coupled to the spindle;

a caster adjustment mechanism adjusting the position of one of the upper pivotable member and lower pivotable member relative to the spindle to thereby adjust caster; and a camber adjustment mechanism adjusting the position of one of the upper pivotable member and lower pivotable member relative to the spindle to thereby adjust camber;

wherein the lower end of the resilient member is coupled to the spindle via the caster adjustment mechanism.

\* \* \* \* \*